(12) United States Patent
Lorenz et al.

(10) Patent No.: US 9,765,839 B2
(45) Date of Patent: Sep. 19, 2017

(54) TORSIONAL VIBRATION DAMPING ARRANGEMENT, IN PARTICULAR FOR THE POWERTRAIN OF A VEHICLE

(71) Applicants: Daniel Lorenz, Bad Kissingen (DE); Ingrid Hoffelner, Knetzgau (DE)

(72) Inventors: Daniel Lorenz, Bad Kissingen (DE); Ingrid Hoffelner, Knetzgau (DE)

(73) Assignee: ZF Friedrichshafen AG, Friedrichshafen (DE)

(*) Notice: Subject to any disclaimer, the term of this patent is extended or adjusted under 35 U.S.C. 154(b) by 285 days.

(21) Appl. No.: 14/400,126

(22) PCT Filed: Apr. 15, 2013

(86) PCT No.: PCT/EP2013/057751
§ 371 (c)(1),
(2) Date: Nov. 10, 2014

(87) PCT Pub. No.: WO2013/167345
PCT Pub. Date: Nov. 14, 2013

(65) Prior Publication Data
US 2015/0122604 A1  May 7, 2015

(30) Foreign Application Priority Data

May 11, 2012  (DE) .................. 10 2012 207 862

(51) Int. Cl.
*F16F 7/116* (2006.01)
*F16F 15/12* (2006.01)
(Continued)

(52) U.S. Cl.
CPC .......... *F16F 7/116* (2013.01); *F16F 15/1206* (2013.01); *F16F 15/13157* (2013.01); *F16F 15/14* (2013.01); *F16F 15/145* (2013.01)

(58) Field of Classification Search
CPC .......... F16F 7/116; F16F 15/14; F16F 15/145; F16F 15/1206; F16F 15/13157
See application file for complete search history.

(56) References Cited

U.S. PATENT DOCUMENTS

| | | | |
|---|---|---|---|
| 8,342,306 B2* | 1/2013 | Werner | F16F 15/12353 192/213.1 |
| 8,991,531 B2* | 3/2015 | Dogel | F16F 15/1478 180/65.21 |
| 9,316,299 B2* | 4/2016 | Doegel | F16H 35/00 |

FOREIGN PATENT DOCUMENTS

| | | |
|---|---|---|
| DE | 102008057648 | 6/2009 |
| DE | 102009042837 | 4/2010 |

(Continued)

*Primary Examiner* — Vishal Sahni
(74) *Attorney, Agent, or Firm* — Cozen O'Connor

(57) ABSTRACT

A torsional vibration damping arrangement comprises an input region to be driven in rotation around an axis of rotation and an output region and a first torque transmission path and parallel thereto a second torque transmission path, both of which proceed from the input region, and a coupling arrangement for superposing the torques conducted via the torque transmission paths, which coupling arrangement communicates with the output region, a phase shifter arrangement for the first torque transmission path for generating a phase shift of rotational irregularities conducted via the first torque transmission path relative to rotational irregularities conducted via the second torque transmission path, and a pendulum mass in the phase shifter arrangement and/or in the coupling arrangement.

5 Claims, 17 Drawing Sheets

(51) Int. Cl.
  *F16F 15/131*  (2006.01)
  *F16F 15/14*  (2006.01)

(56) References Cited

FOREIGN PATENT DOCUMENTS

| | | |
|---|---|---|
| DE | 102011007118 | 12/2011 |
| DE | 102011075244 | 12/2011 |
| EP | 2600030 | 6/2013 |
| WO | WO 2011/147598 | 12/2011 |
| WO | WO2011147598 | * 12/2011 |

* cited by examiner

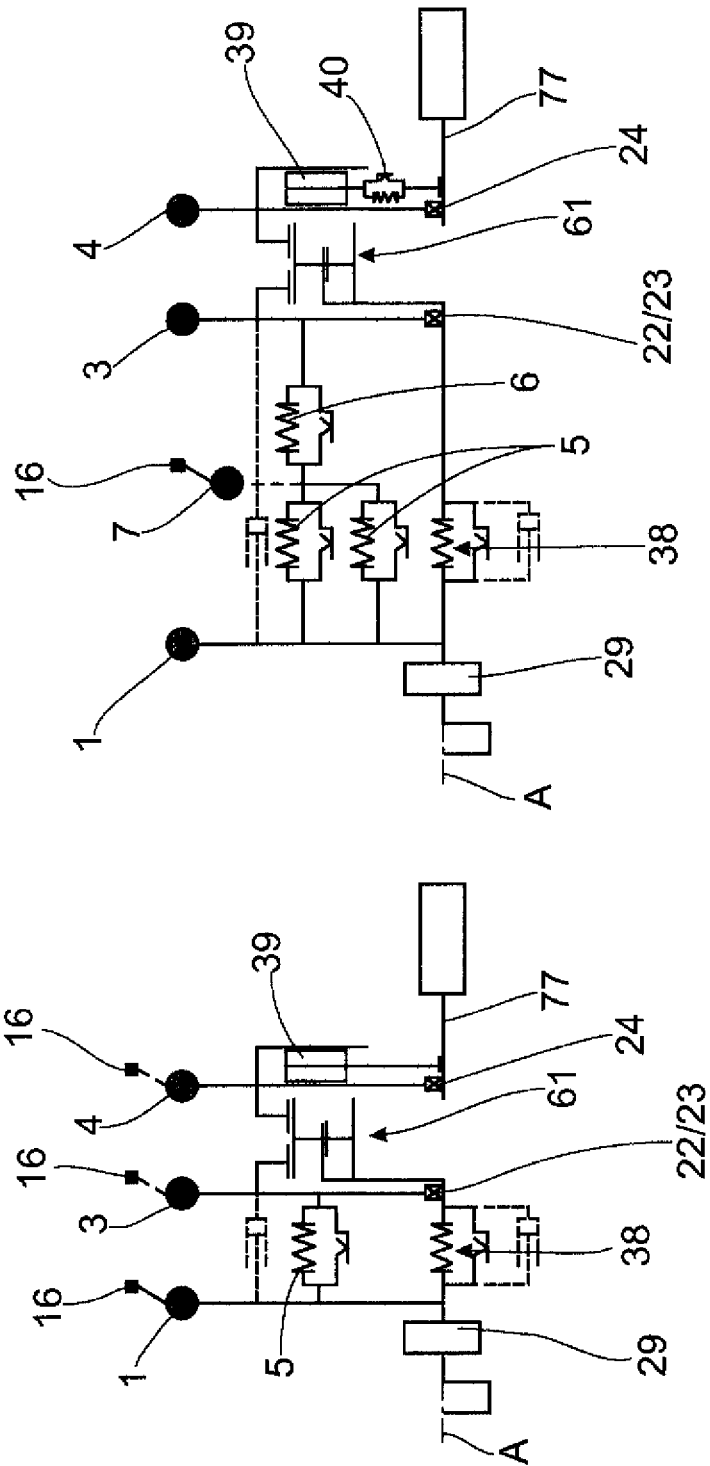

TORSIONAL VIBRATION DAMPING ARRANGEMENT, IN PARTICULAR FOR THE POWERTRAIN OF A VEHICLE

PRIORITY CLAIM

This is a U.S. national stage of application No. PCT/EP2013/057751, filed on Apr. 15, 2013. Priority is claimed on the following application: Country: Germany, Application No.: 102012207862.0, Filed: May 11, 2012, the content of which is incorporated herein by reference in its entirety.

FIELD OF THE INVENTION

The present invention is directed to a torsional vibration damping arrangement, particularly for the powertrain of a vehicle, comprising an input region to be driven in rotation around an axis of rotation A and an output region, wherein there are provided between the input region and the output region a first torque transmission path and parallel thereto a second torque transmission path and a coupling arrangement for superposing the torques conducted via the torque transmission paths, wherein a phase shifter arrangement is provided in the first torque transmission path for generating a phase shift of rotational irregularities conducted via the first torque transmission path relative to rotational irregularities conducted via the second torque transmission path.

BACKGROUND OF THE INVENTION

A generic torsional vibration damping arrangement known from the German patent application DE 10 2011 007 118 A1 divides the torque introduced into an input region, for example through a crankshaft of an internal combustion engine, into a torque component transmitted via a first torque transmission path and a torque component conducted via a second torque transmission path. Not only is there a static torque divided in this torque division, but also the vibrations and rotational irregularities which are generated, for example, by the periodically occurring ignitions in an internal combustion engine and which are contained in the torque to be transmitted are also divided proportionately into the two torque transmission paths. The torque components transmitted via the two torque transmission paths are brought together again in a coupling arrangement and are then introduced as total torque into the output region, for example, a friction clutch or the like.

A phase shifter arrangement is provided in at least one of the torque transmission paths. This phase shifter arrangement operates like a vibration damper, i.e., it is formed with a primary side and a secondary side which is rotatable with respect to the primary side through the compressibility of a spring arrangement. In particular when this vibrational system passes into a supercritical state, i.e., when it is excited with vibrations exceeding the resonant frequency of the vibrational system, a phase shift of up to 180° occurs. This means that at maximum phase displacement the vibration components proceeding from the vibrational system are shifted in phase by 180° with respect to the vibration components received by the vibrational system. Since the vibration components conducted via the other torque transmission path do not undergo a phase shift or, if so, a different phase shift, the vibration components which are contained in the unified torque components and which are then shifted in phase with respect to one another are destructively superposed on one another such that, ideally, the total torque introduced into the output region is a static torque which contains essentially no vibration components.

SUMMARY OF THE INVENTION

Proceeding from the background art cited above, it is an object of the present invention to provide a torsional vibration damping arrangement which has a further improved vibration damping behavior.

According to the invention, this object is met through a torsional vibration damping arrangement, particularly for the powertrain of a vehicle, comprising an input region to be driven in rotation around an axis of rotation A and an output region, wherein there are provided between the input region and the output region a first torque transmission path and parallel thereto a second torque transmission path and a coupling arrangement for superposing the torques conducted via the torque transmission paths, and wherein a phase shifter arrangement is provided in the first torque transmission path for generating a phase shift of rotational irregularities conducted via the first torque transmission path relative to rotational irregularities conducted via the second torque transmission path.

There is further provided in this arrangement a pendulum mass which is arranged in the phase shifter arrangement or in the coupling arrangement, or in the phase shifter arrangement and in the coupling arrangement. The various arrangement of the pendulum mass in the torsional vibration damper arrangement makes it possible to react to the corresponding vibration behavior and technical spatial conditions with respect to installation space. The pendulum mass, also known as mass damper or damper mass, is formed such that it displaces relative to its carrier element under the influence of a torsional irregularity and accordingly can influence the vibration behavior of the torsional vibration arrangement through its varied mass position.

Further advantageous embodiments and further developments of the invention are indicated in the following description.

In a first advantageous embodiment, the coupling arrangement comprises a first input portion and a second input portion into which torques guided via the first torque transmission path and second torque transmission path are introduced, and a superposition unit in which the introduced torques are combined again, and an output part which conveys the combined torque, for example, to a friction clutch. The first input portion is connected in operative direction thereof to the phase shifter arrangement on one side and to the superposition unit on the other side. The second input portion is connected in operative direction thereof to the input region on one side and to the superposition unit on the other side. The superposition unit is in turn connected in operative direction thereof to both the first input portion and second input portion on one side and to the output portion on the other side. The output portion forms the output region and, in an advantageous embodiment, can receive a friction clutch.

In order to achieve the phase shift in a simple manner in one of the torque transmission paths, it is suggested that the phase shifter arrangement comprises a vibrational system with a primary side and a secondary side which is rotatable with respect to the primary side around the axis of rotation A against the action of a spring arrangement. A vibrational system of this type can be constructed as a kind of vibration damper, known per se, in which the resonant frequency of the vibrational system can be adjusted in a defined manner, particularly by influencing the primary-side mass and secondary-side mass as well as the stiffness of the spring arrangement, and the frequency at which there is a transition to the supercritical state can accordingly also be determined.

In a further advantageous embodiment the pendulum mass is positioned in the coupling arrangement. The two divided torques are guided into the coupling arrangement by means of a first input portion and a second input portion and are combined again in an intermediate portion. The first input portion which is preferably formed by an intermediate mass is connected to the output portion of the phase shifter, advantageously in single-row embodiments with an outer spring set formed by the hub disk or, in two-row embodiment with an outer spring set and an inner spring set formed by the cover plate, so as to be fixed with respect to rotation relative to it. The second input portion which is formed by the planet carrier in an advantageous embodiment is connected to the input region so as to be fixed with respect to rotation relative to it, which input region can be constructed as a crankshaft or primary mass. The torque combined in the superposition unit can be conveyed via the output portion, for example to a friction clutch. The positioning of the pendulum mass within the coupling arrangement can be carried out at the first input portion, preferably at the intermediate mass and/or hub disk, the second input portion which is advantageously formed as planet carrier, the intermediate portion which is possibly formed as superposition unit, and at the output part.

The positioning of the pendulum mass at the first input portion or intermediate mass and/or hub disk may be seen as particularly advantageous owing to the large connection radius. By positioning the pendulum mass at the intermediate mass and/or the hub disk, rotational irregularities in the first torque transmission path which may be considered as the main branch of torque transmission, can be reduced, but by tuning the pendulum mass in a corresponding manner the engine orders can also be increased in order to improve a superposition of torques of the first torque transmission path and second torque transmission path.

In an advantageous positioning of the pendulum mass at the second input portion which transmits the second torque and which can be designated as superposition branch and is formed in this case by the planet carrier, the pendulum mass can be seen as particularly efficient because of the large connection radius. Due to the stiff connection of the superposition branch, the higher engine orders are not reduced in this branch. Therefore, the cancellation of the signals is not possible optimally. This arrangement of the pendulum mass at the planet carrier reduces the higher engine orders prior to superposition and prior to pre-decoupling in both torque transmission paths. Therefore, the signal shape in both torque transmission paths is more similar and thus more advantageous for the superposition. Accordingly, a cancellation functions better, i.e., the efficiency of the torsional vibration damper arrangement is enhanced.

A preferable positioning of the pendulum mass at the radially outer region of the output portion can be particularly efficient due to the geometric constraints.

From a technical point of view relating to installation space, however, it can also be advantageous to arrange the pendulum mass farther radially inward at the output portion. Installing the pendulum mass at the output portion of the coupling arrangement can further reduce the residual irregularity, particularly at medium to higher rotational speeds. In this arrangement, the power splitting can be configured to very low speeds (idle to medium speeds) and can operate optimally exactly where the pendulum mass cannot yet generate the required countertorque for reducing the alternating torque due to the lack of excitation speed and is therefore severely limited with respect to efficiency. In the range of higher speeds in which the efficiency of power splitting decreases without further adjustment, the pendulum mass can operate optimally because of the excitation speed that is then available and can significantly further reduce the existing rotational irregularity. A further advantage of the pre-decoupling with power splitting consists in that the pendulum masses can be made substantially lighter and smaller compared to decoupling with a dual-mass flywheel or a dual-mass flywheel with pendulum mass. This can offer advantages with respect to bearing load, wear, required installation space and total mass moment of inertia. Advantages can be gained through the combination of power splitting with a pendulum mass particularly with respect to downspeeding, downsizing, increased nominal torque at lower speeds with sharply increasing excitation in this range, and cylinder deactivation.

In a further advantageous embodiment, the pendulum mass can be positioned in the phase shifter arrangement. In the phase shifter arrangement which primarily comprises a primary mass, a cover plate connected to the primary mass, and an outer spring set, a portion of the torque coming from the input region, for example the crankshaft, is conducted via the primary mass into the outer spring set. The hub disk receives the torque from the outer spring set and conveys it to the intermediate mass.

In a further advantageous embodiment, an inner spring set can be positioned in the phase shifter arrangement in addition to the outer spring set. In this case, the torque present at the hub disk is conducted into the inner spring set and conveyed from the inner spring set to the cover plates. The cover plates which are connected to the intermediate mass so as to be fixed with respect to rotation relative to it convey the torque to the intermediate mass.

With respect to the positioning in the phase shifter arrangement, the pendulum mass can be positioned on one side at the primary mass, on one side at the cover plate, or on both sides at the primary mass and cover plate radially inward of or radially outward of the outer spring set and/or radially outward of the inner spring set. Depending on the arrangement, there can be advantages with respect to axial or radial installation space and efficiency of the pendulum mass. The advantageous positioning of the pendulum mass at the primary mass and/or cover plate can be used in combination with power splitting to damp or reduce certain frequencies or engine orders (in frequency-variable/order-variable manner). Not only is a better pre-decoupling of the primary-side rotational irregularity achieved in this way by reducing one or more engine orders, but a more optimal superposition is also achieved by adapting the signals in the two power splitting branches. The possible advantages of the more favorable superposition in the coupling gear unit are gained because higher engine orders are canceled or sharply reduced in the input signal, and the signal in the superposition branch is therefore identical to, or at least similar to, that of the main branch with respect to the engine order to be canceled, generally the principal engine order. This happens because the outer spring set or inner spring set in the main branch can effect a very good decoupling of higher engine orders. Due to the stiff connection of the superposition branch, the higher engine orders are not reduced in this branch. Therefore, optimal cancellation of the signals is not possible. The arrangement of the pendulum mass at the primary mass and/or cover plate reduces the higher engine order prior to the superposition and prior to the pre-decoupling in both branches. Therefore, the signal shape in the two branches is similar and therefore more favorable for the superposition. Accordingly, the cancellation functions better, i.e., the efficiency of the power splitting is increased.

BRIEF DESCRIPTION OF THE DRAWINGS

A preferred embodiment example of the invention and further constructional variants will be described in the following with reference to the accompanying drawings. The drawings show:

FIGS. 17A and B a torsional vibration damper arrangements as a schematic diagram with individual connection options for the pendulum mass.

DETAILED DESCRIPTION OF THE PRESENTLY PREFERRED EMBODIMENTS

Figure 1:
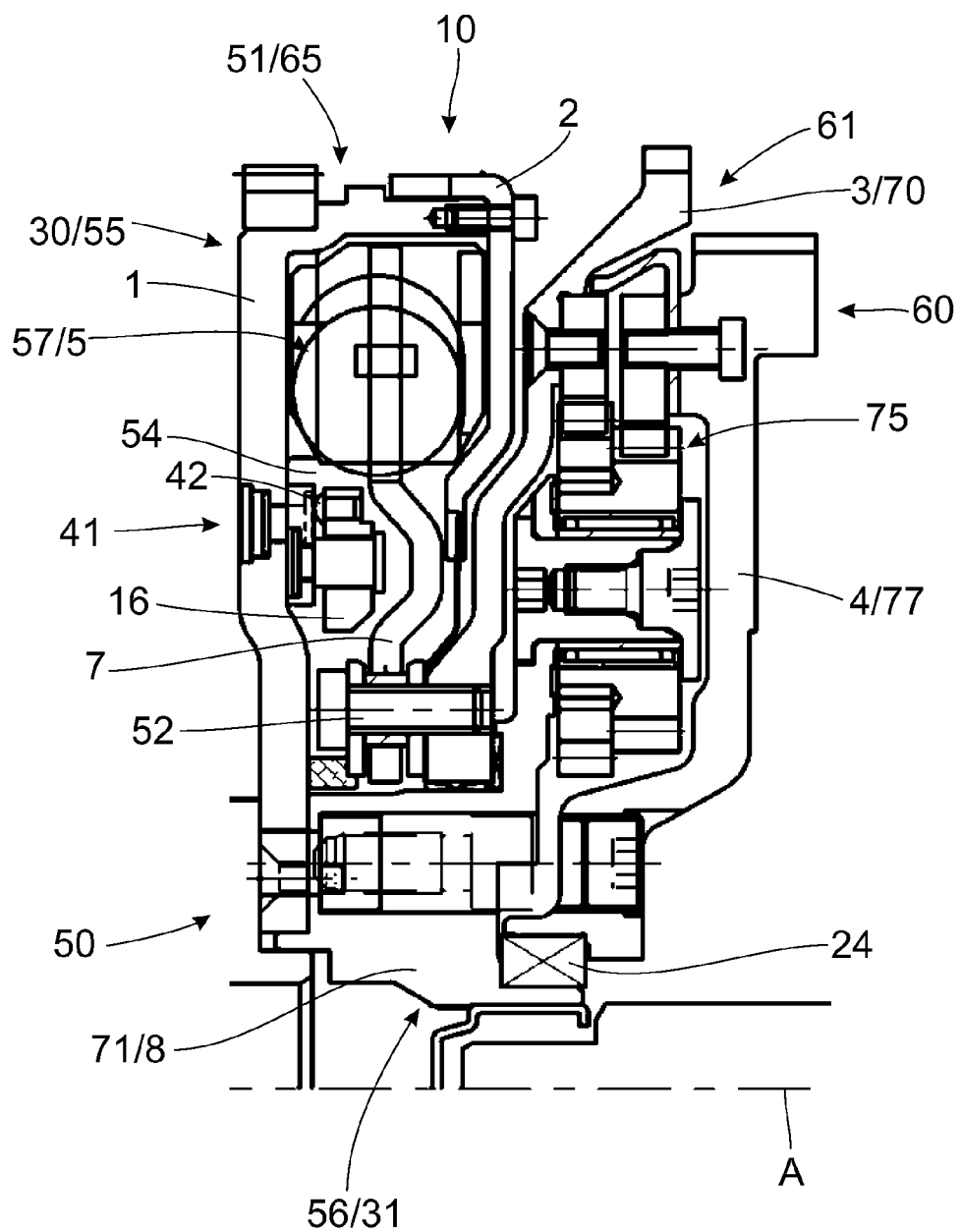
FIG. 1 a torsional vibration damper arrangement with a pendulum mass and an adapter piece at a primary mass of the phase shifter arrangement radially inward of an outer damper.

FIG. 1 shows a torsional vibration damper arrangement 10 which operates on the principle of power splitting or torque splitting. The torsional vibration damper arrangement 10 can be arranged in a powertrain, for example, of a vehicle, between a drive unit, i.e., for example, an internal combustion engine, and the subsequent portion of the powertrain, i.e., for example, a friction clutch, a hydrodynamic torque converter or the like.

The torsional vibration damper arrangement 10 comprises an input region, designated generally by 50, which is rotatable around the axis of rotation A. This input region 50 can be connected, for example screwed, to a crankshaft of an internal combustion engine. In the input region 50, the torque received from a drive unit branches into a first torque transmission path 55, which may also be referred to as main branch 30, and into a second torque transmission path 56 which may also be referred to as superposition branch 31. In the region of a coupling arrangement, designed generally by 61, the torque components conducted via the two torque transmission paths 55, 56 are introduced into the coupling arrangement 61 by means of a first input portion 70 and a second input portion 71 and are combined again in superposition unit 75 and then conveyed to an output region 60 which comprises a secondary flywheel 4 of a friction clutch in the depicted example.

A vibrational system, designed generally by 51, is integrated in the first torque transmission path 55. The vibrational system 51 acts as a phase shifter arrangement 65 and comprises a primary mass 1 which is to be connected, for example, to the drive unit and an intermediate mass 3 which conveys the torque. The primary mass 1 together with the cover plate 2 to which it is connected so as to be fixed with respect to rotation relative to it substantially completely surrounds radially outwardly a spatial region in which an outer spring set 5 for the vibrational system 51 is received. The outer spring set 5 comprises a plurality of spring units 57 which are arranged successively in circumferential direction and also possibly so as to be nested one inside the other. Each spring unit 57 preferably comprises at least one compression coil spring. The spring units 57 of the outer spring set 5 are supported with respect to the primary mass 1 on the one hand and with respect to a hub disk 7 formed as center disk on the other hand. This hub disk 7 is connected, e.g., by threaded bolts 52, to the intermediate mass 3 so as to be fixed with respect to rotation relative to it.

A pendulum mass 16 which is formed in this case with an additional adapter piece 41 is positioned at the primary mass 1 radially inward of the outer spring set 5 in an installation space which is formed by the outwardly bent primary mass 1 and the outwardly bent hub disk 7. The adapter piece 41 serves to reduce friction for an axial stop 42 of the pendulum mass 16. The surface of the adapter piece 41 is formed such that it reduces friction, e.g., by means of specially applied coatings such as Teflon so that the axial friction between the pendulum mass 16 and the axial stop 42 can be minimized.

The pendulum mass 16 shown here operates on the known Salomon principle. However, a pendulum mass 16 operating on the known Sarazin principle or any functionally suitable pendulum mass can also be used for these constructional variants and for the constructional variants hereinafter referring to FIGS. 2-16. Basically, the known Salomon-type pendulum mass or Sarazin-type pendulum mass (which could also be referred to as Sarazin-type mass damper and Salomon-type mass damper) function in the same way. Both pendulum masses are based on the principle of mass displacement relative to their carrier part due to varying rotational speeds. The Salomon-type mass damper is more advantageous with respect to the radial installation space requirement. A further advantage of the Salomon-type mass damper consists in the simple adaptation of the tuning order through corresponding configuration of the track geometry on which the pendulum mass 16 moves. In the Sarazin-type mass damper the centroid radius of the mass bodies must be changed, e.g., through a resiliently supported mass which moves radially outward as the rotational speed increases.

Figure 2:
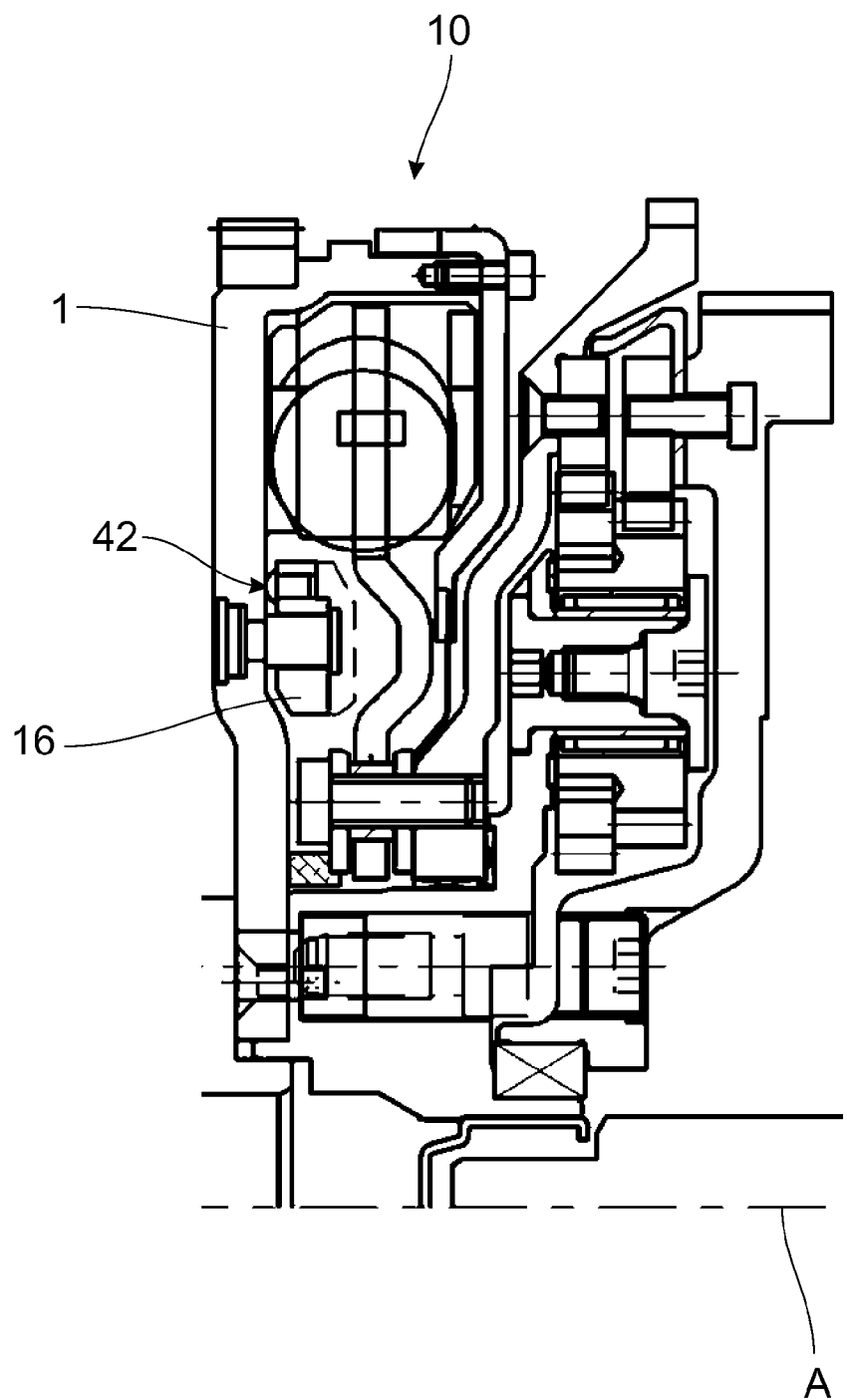
FIG. 2 a torsional vibration damper arrangement according to FIG. 1, but without adapter piece.

FIG. 2 shows a torsional vibration damper arrangement 10 basically like that shown in FIG. 1, but with a pendulum mass 16 which is positioned at the primary mass 1 radially inward of the outer spring set 5 without the adapter piece 41. As a result of the omission of the adapter piece 41, the axial stop 42 rubs directly against the primary mass 1 and the pendulum mass 16 can be made larger due to the absence of the adapter piece 41. Since, as a rule, the primary mass need not be reworked or coated with a friction-reducing coating such as Teflon, the friction between the primary mass 1 and pendulum mass 16 can be higher than when using an adapter piece as described in FIG. 1. The increased friction between the pendulum mass 16 and the primary mass 1 can have an influence on the efficiency of the pendulum mass 16. In a further embodiment, not shown, the primary mass 1 can be coated with a friction-reducing coating such as Teflon at the frictional surface with the axial stop 42 of the pendulum mass 16. The pendulum mass 16 shown here operates on the Salomon principle.

Figure 3:
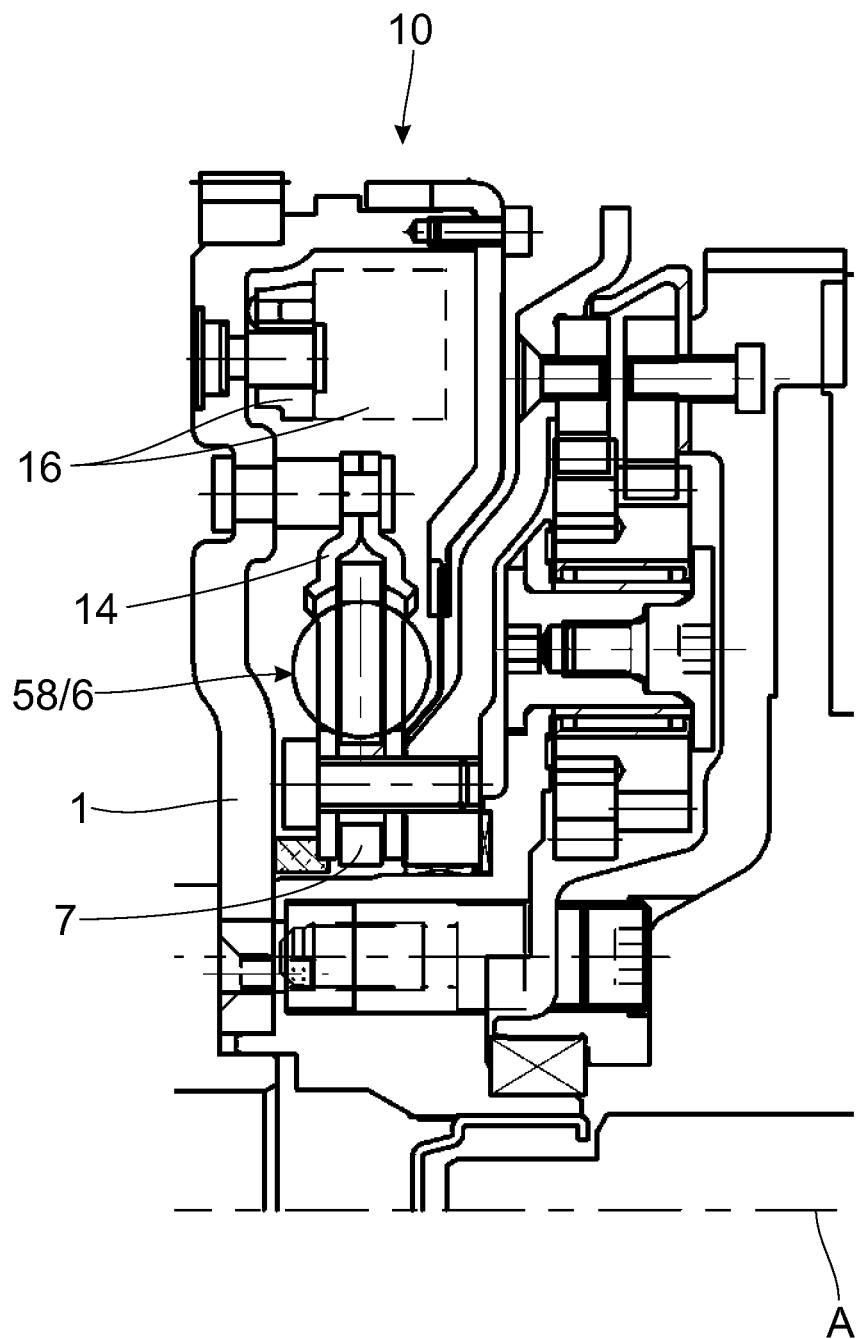
FIG. 3 a torsional vibration damper arrangement with a pendulum mass at the primary mass radially outward of an inner damper.

FIG. 3 shows a torsional vibration damper arrangement 10 basically like that shown in FIG. 1, but with a pendulum mass 16 which is fastened at the primary mass 1 radially outward of an inner spring set 6. This inner spring set 6 also comprises a plurality of spring units 58 which are arranged successively in circumferential direction and also possibly so as to be nested one inside the other. Each spring unit 58 is preferably formed with at least one compression coil spring. The spring units 58 of the inner spring set 6 are supported on at least one shroud 14 on one side and on the hub disk 7 on the other side. The outer spring set 5 is not provided in this embodiment. The pendulum mass shown here operates on the Salomon principle.

Figure 4:
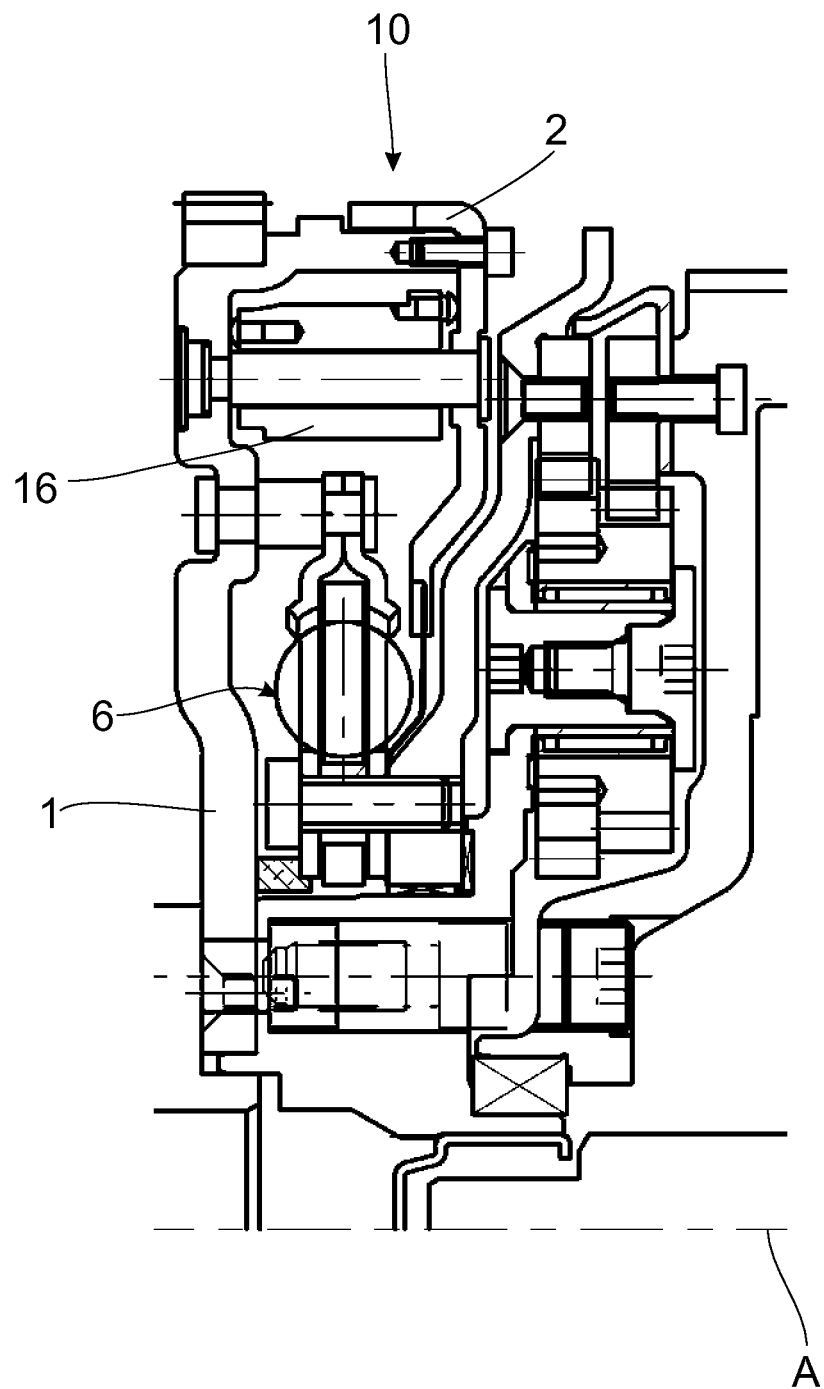
FIG. 4 a torsional vibration damper arrangement with a pendulum mass which is connected to the primary mass and a cover plate connected to the latter, radially outward of the inner damper.

FIG. 4 shows a torsional vibration damper arrangement 10 basically like that shown in FIG. 1, but with a pendulum mass 16 which is fastened radially outward of the inner spring set 6 at the primary mass 1 on one side and at the cover plate 2 on the other side. In this embodiment, the outer spring set 5 is not provided. The pendulum mass 16 shown here operates on the Salomon principle.

Figure 5:
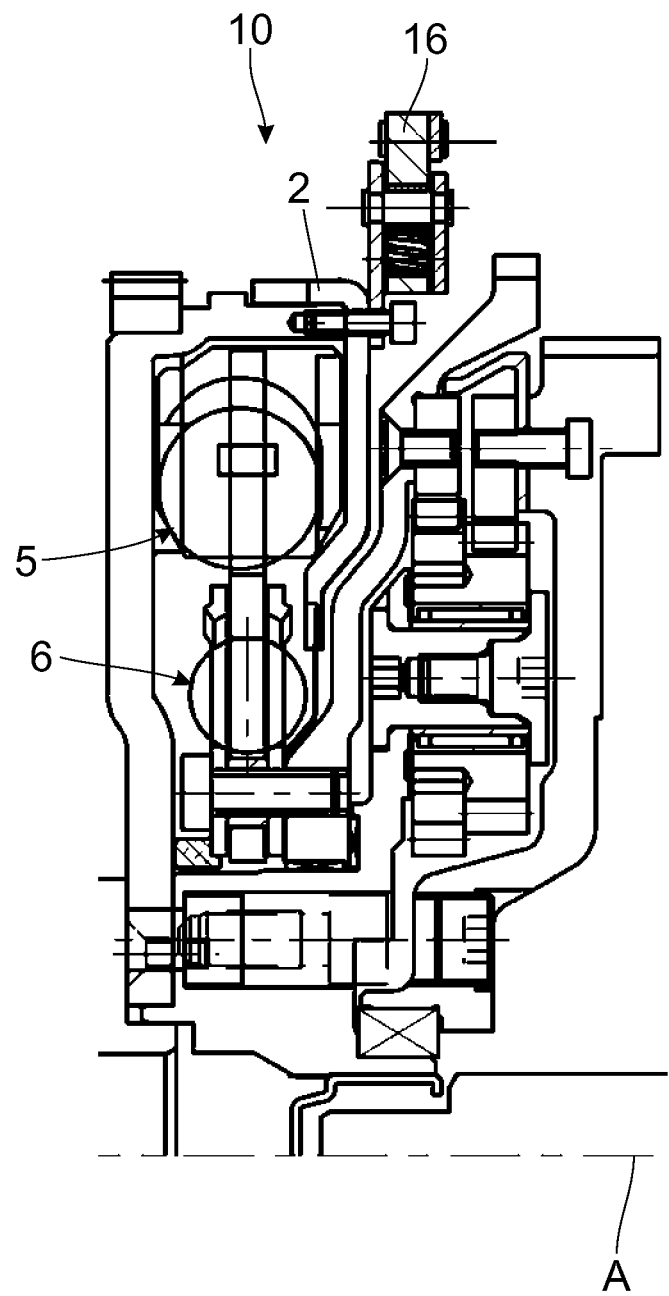
FIG. 5 a torsional vibration damper arrangement with a pendulum mass which is arranged radially outward at the cover plate.

FIG. 5 shows a torsional vibration damper arrangement 10 basically like that shown in FIG. 1, but with a pendulum mass 16 which is fastened radially outward at the cover plate 2. This arrangement of the pendulum mass 16 is particularly efficient due to its being positioned radially far outward. Compared to FIG. 1, this embodiment of the torsional vibration damper arrangement 10 has in addition to the outer spring set 5 an optional inner spring set 6 as was already described referring to FIG. 3. The pendulum mass 16 shown here operates on the Sarazin principle.

Figure 6A:
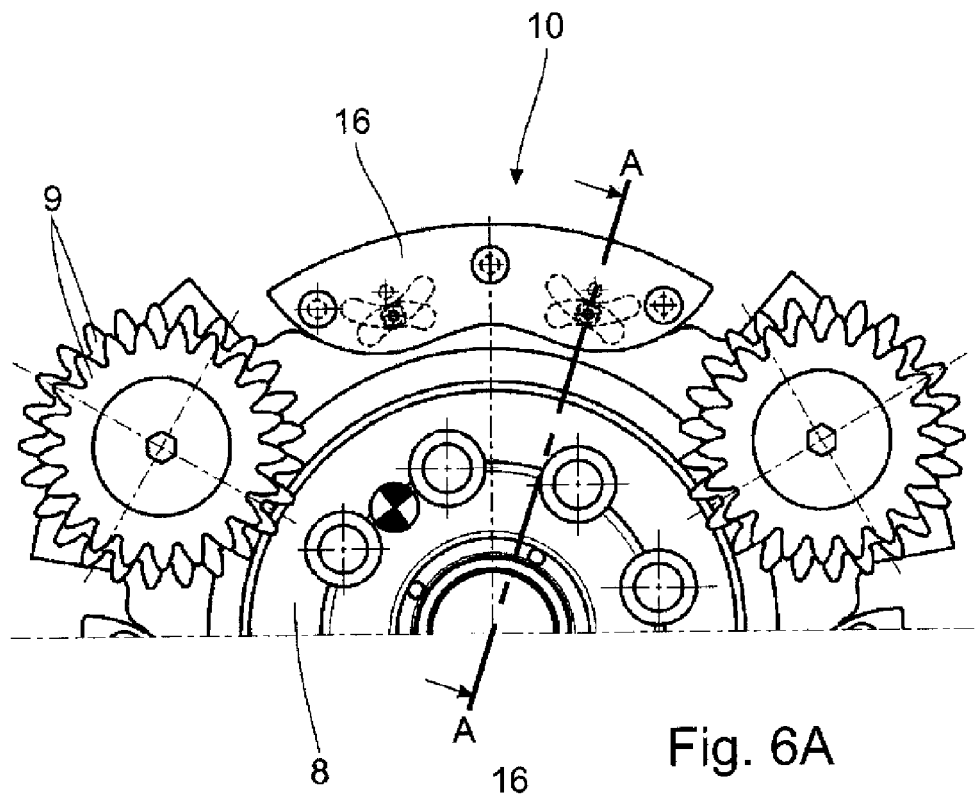
FIG. 6A a torsional vibration damper arrangement with a pendulum mass at a planet carrier of a coupling arrangement.

FIGS. 6A and B shows a torsional vibration damper arrangement 10 basically like that shown in FIG. 1, but with a pendulum mass 16 positioned radially outward at the planet carrier 8 between the planet wheels 9. In order to reduce installation space, the pendulum masses can be rounded off at the outer diameter. Because of its positioning on the radially outer side, the pendulum mass 16 is particularly efficient compared to an installation located farther radially inward. The pendulum mass 16 shown here operates on the Salomon principle.

Figure 6B:
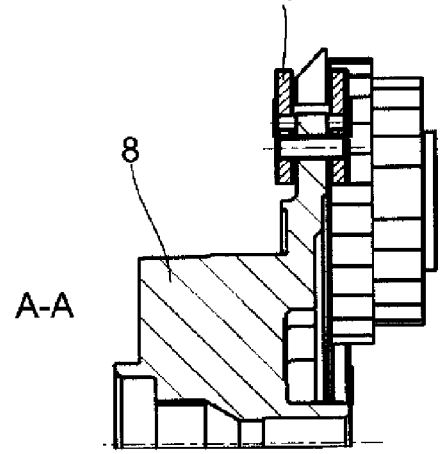
FIG. 6B a cross-sectional view along the line A-A in FIG. 6A.
Figure 7A:
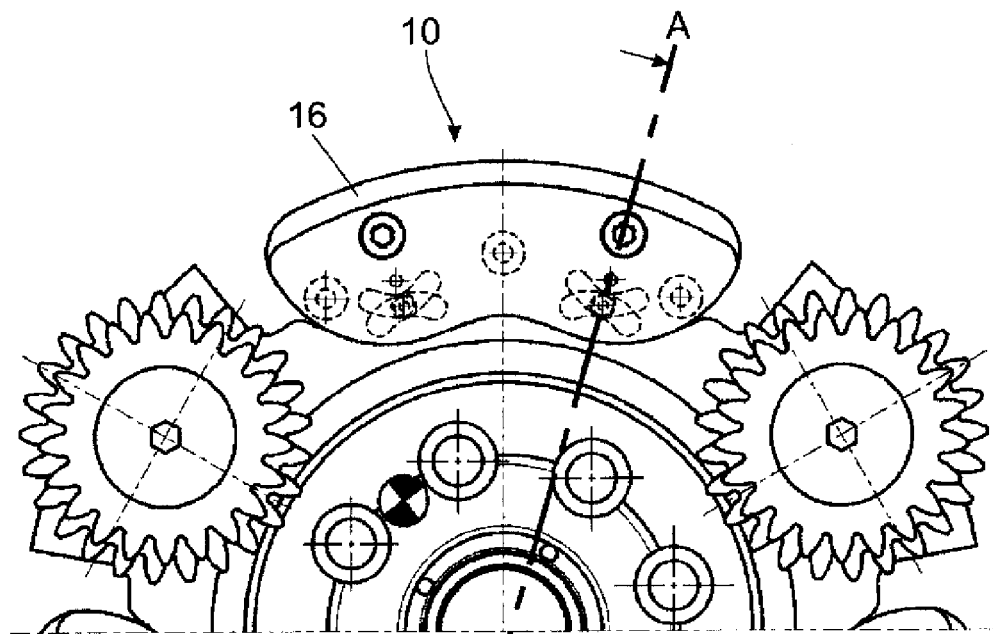
FIG. 7A a torsional vibration damper arrangement with a pendulum mass at the planet carrier and a larger mass of the pendulum mass 16 compared to FIG. 6.
Figure 7B:
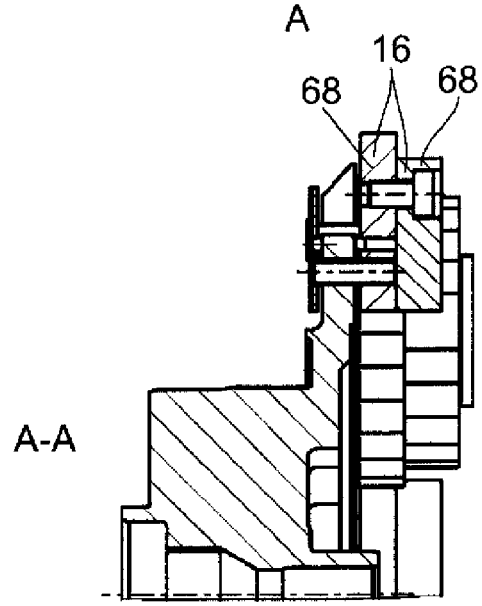
FIG. 7B a cross-sectional view along the line A-A in FIG. 7A.

FIGS. 7A and B shows a torsional vibration damper arrangement 10 basically like that shown in FIG. 6, but with a pendulum mass 16 having a larger damper mass 68. This larger damper mass 68 can be fastened to the existing mass of the pendulum mass 16 by means of a screw connection. As shown in FIGS. 6A and B, the pendulum mass 16 operates on the Salomon principle.

Figure 8:
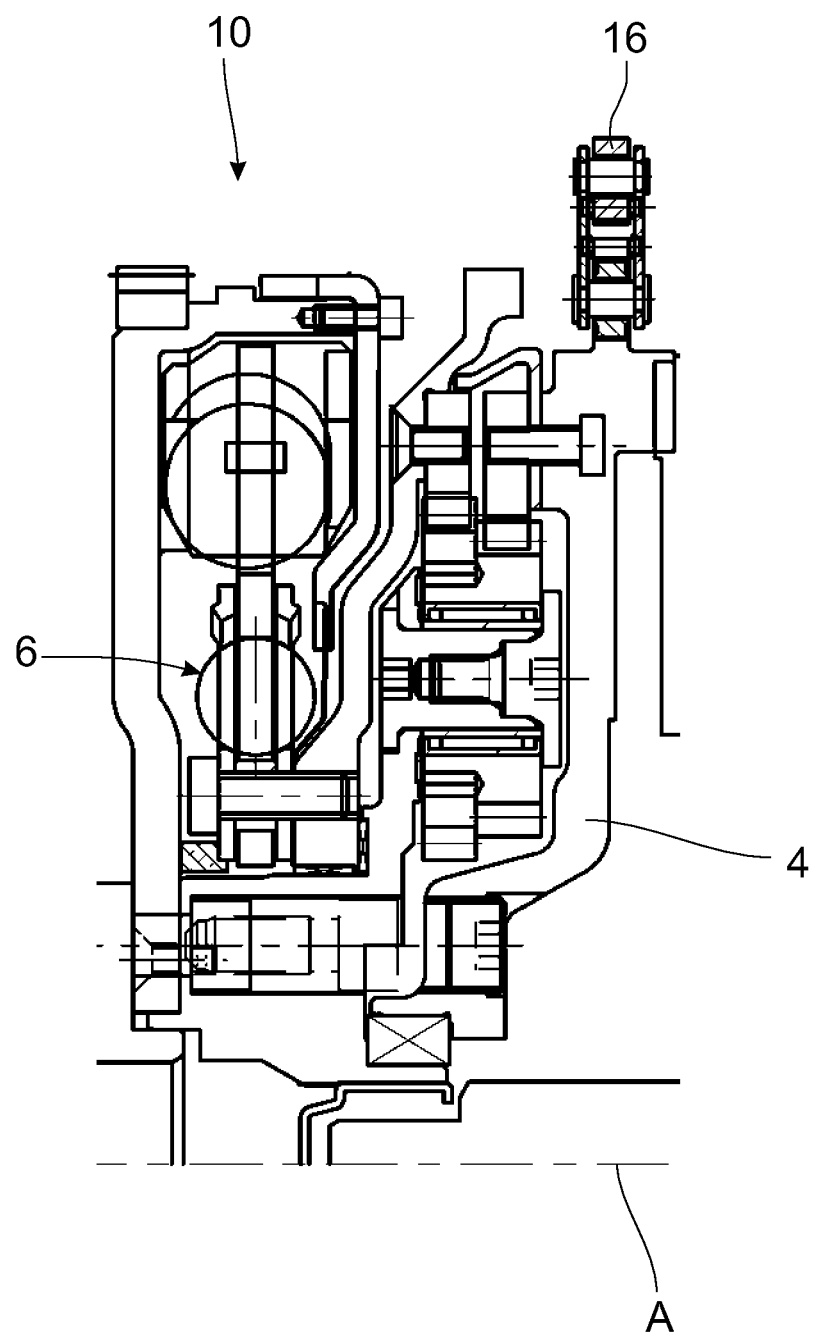
FIG. 8 a torsional vibration damper arrangement with a pendulum mass radially outward at the output portion operating on the Sarazin principle.

FIG. 8 shows a torsional vibration damper arrangement 10 basically like that shown in FIG. 1, but with a pendulum mass 16 which is positioned radially outward at the secondary flywheel 4 and can be very efficient due to this radially outward position. Because of the fixed geometric conditions, there is no ability to vary frequency. In this case, a fixed frequency mass damper is provided. Compared to FIG. 1, this embodiment of the torsional vibration damper arrangement 10 has an optional inner spring set 6 in addition. The pendulum mass 16 shown here operates on the Sarazin principle.

Figure 9:
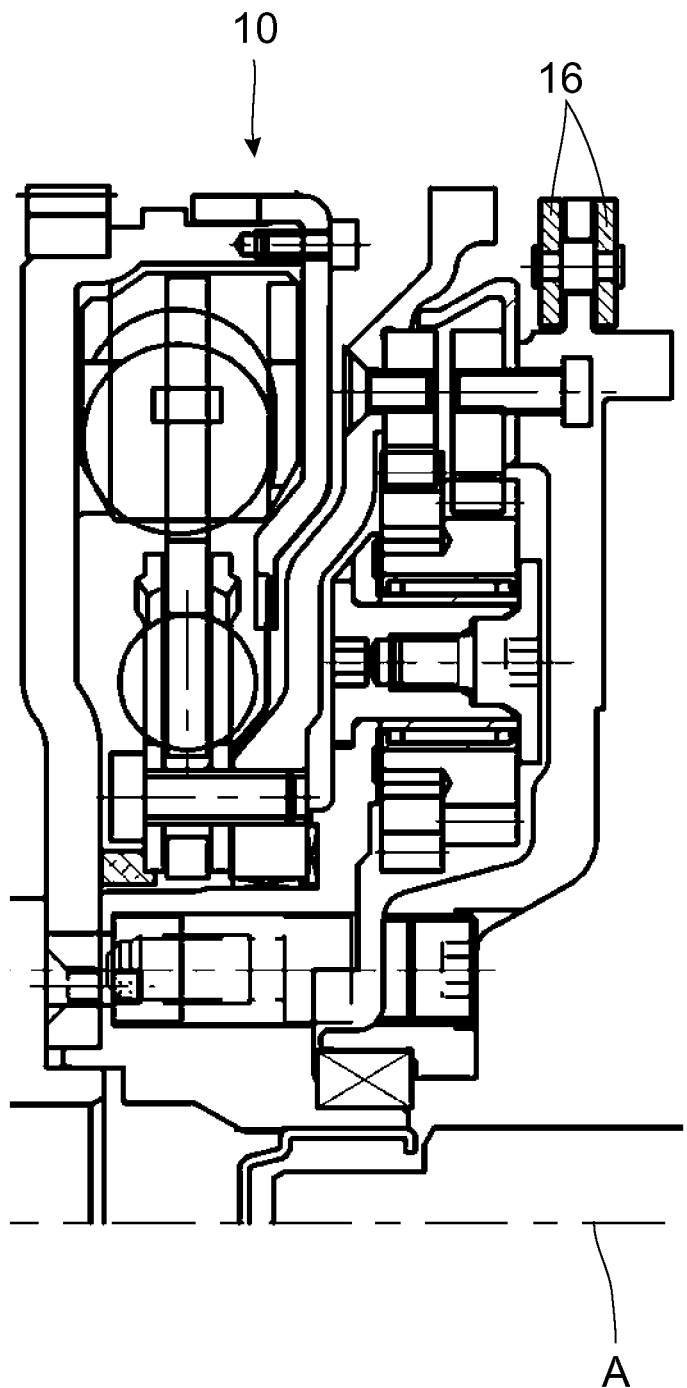
FIG. 9 a torsional vibration damper arrangement with a pendulum mass radially outward at the output portion operating on the Salomon principle.

FIG. 9 shows a torsional vibration damper arrangement 10 basically like that shown in FIG. 8, but with a Salomon-type pendulum mass 16.

Figure 10:
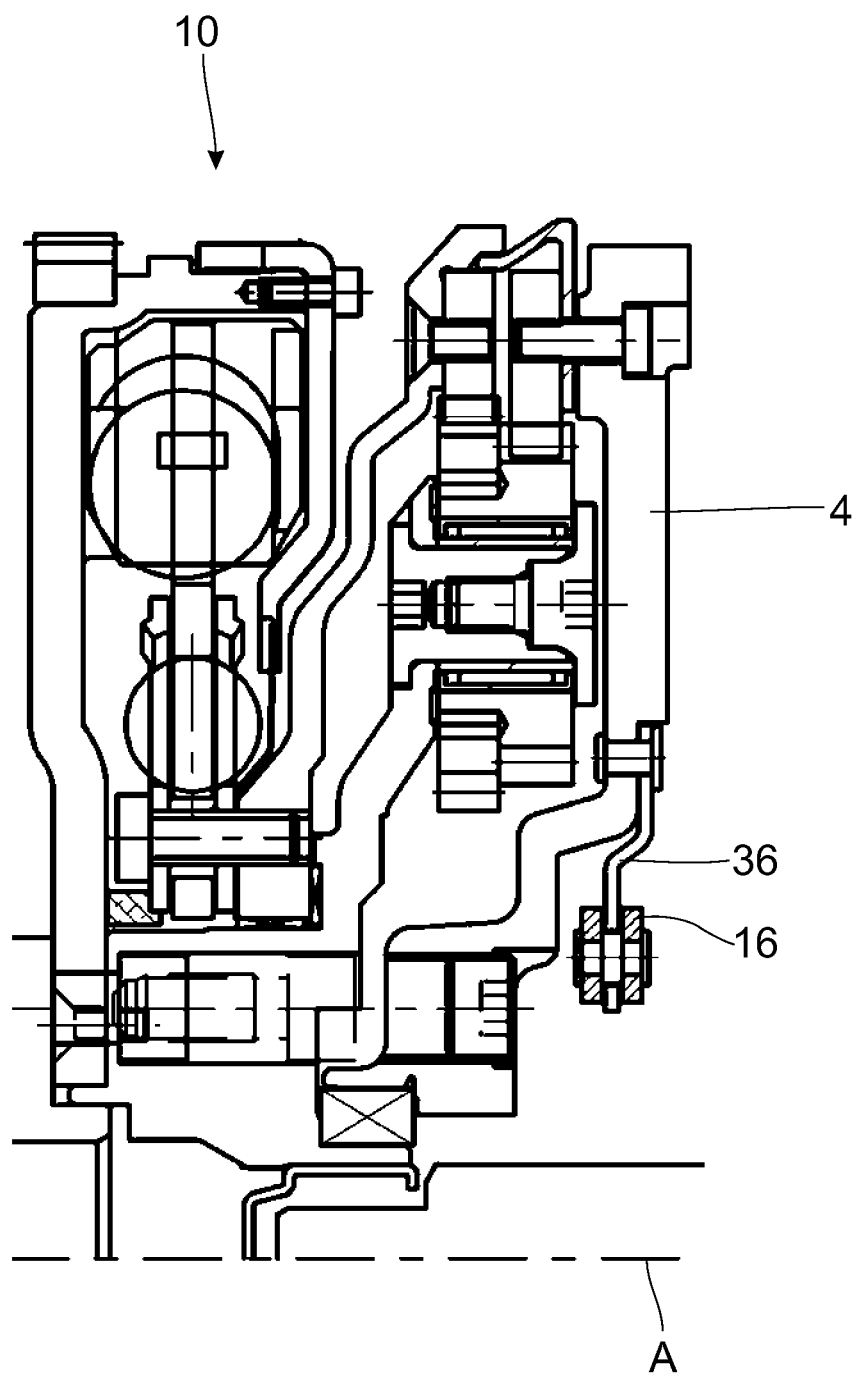
FIG. 10 a torsional vibration damper arrangement with a pendulum mass radially inward at the output portion.

FIG. 10 shows a torsional vibration damper arrangement 10 basically like that shown in FIG. 6, but with a pendulum mass 16 which is positioned radially inward on the side of a coupling, which is to be flanged for example, at the secondary flywheel 4 by means of an offset connection plate 36. This embodiment is used chiefly in radially limited installation spaces for the torsional vibration damper arrangement 10. The pendulum mass 16 shown here is a Salomon-type mass damper.

Figure 11:
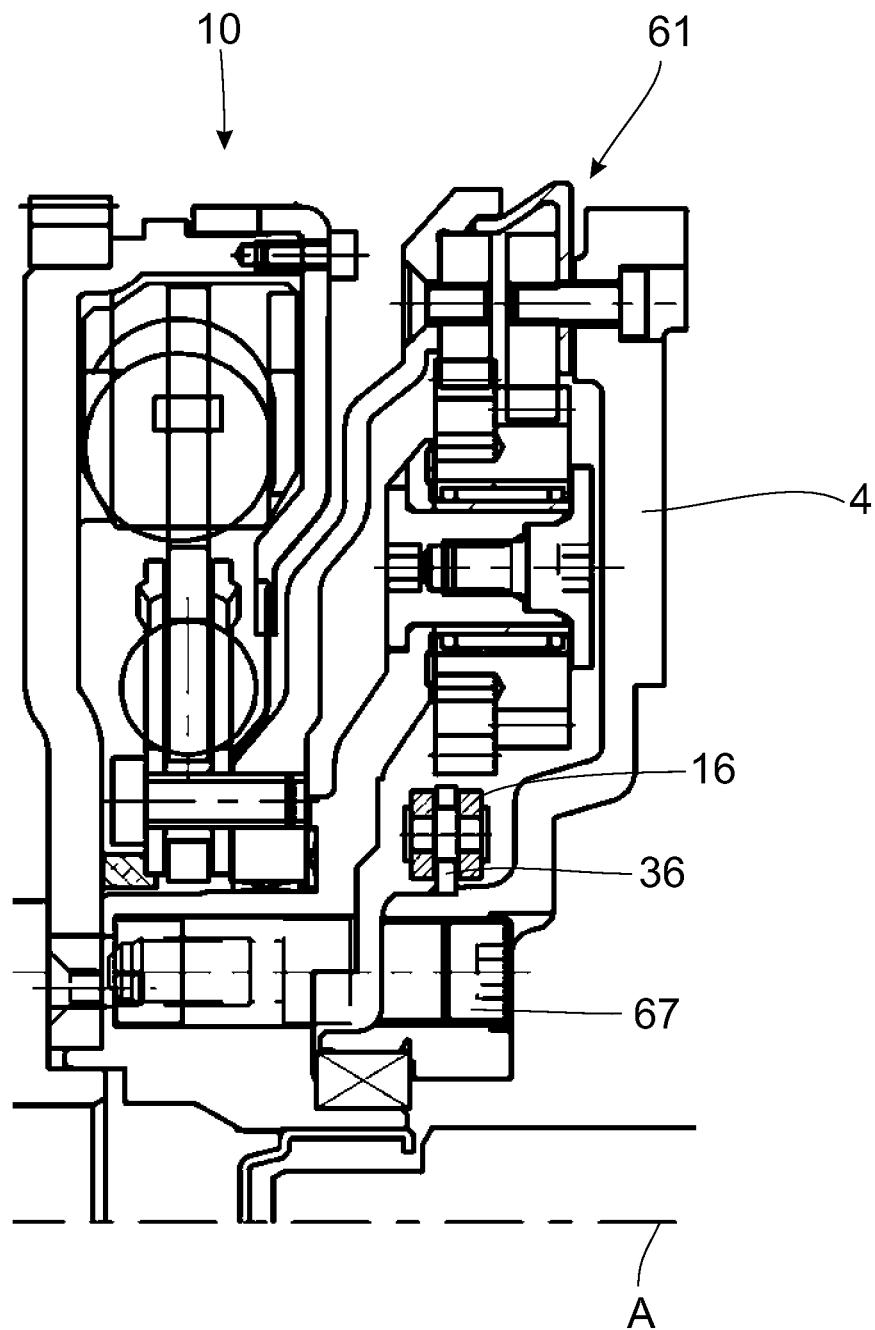
FIG. 11 a torsional vibration damper arrangement with a pendulum mass at the output portion radially outside of a through-aperture at the axial height of the coupling arrangement.

FIG. 11 shows a torsional vibration damper arrangement 10 basically like that shown in FIG. 10, but with a pendulum mass 16 which is positioned at the secondary flywheel 4 by means of a connection plate 36 radially outward of the through-aperture 67 at the axial height of the coupling arrangement 61. This embodiment is particularly advantageous with respect to space requirement because the space between the coupling arrangement 61 and secondary flywheel 4 can be used. The pendulum mass 16 shown here operates on the Salomon principle.

Figures 12A, 12B:
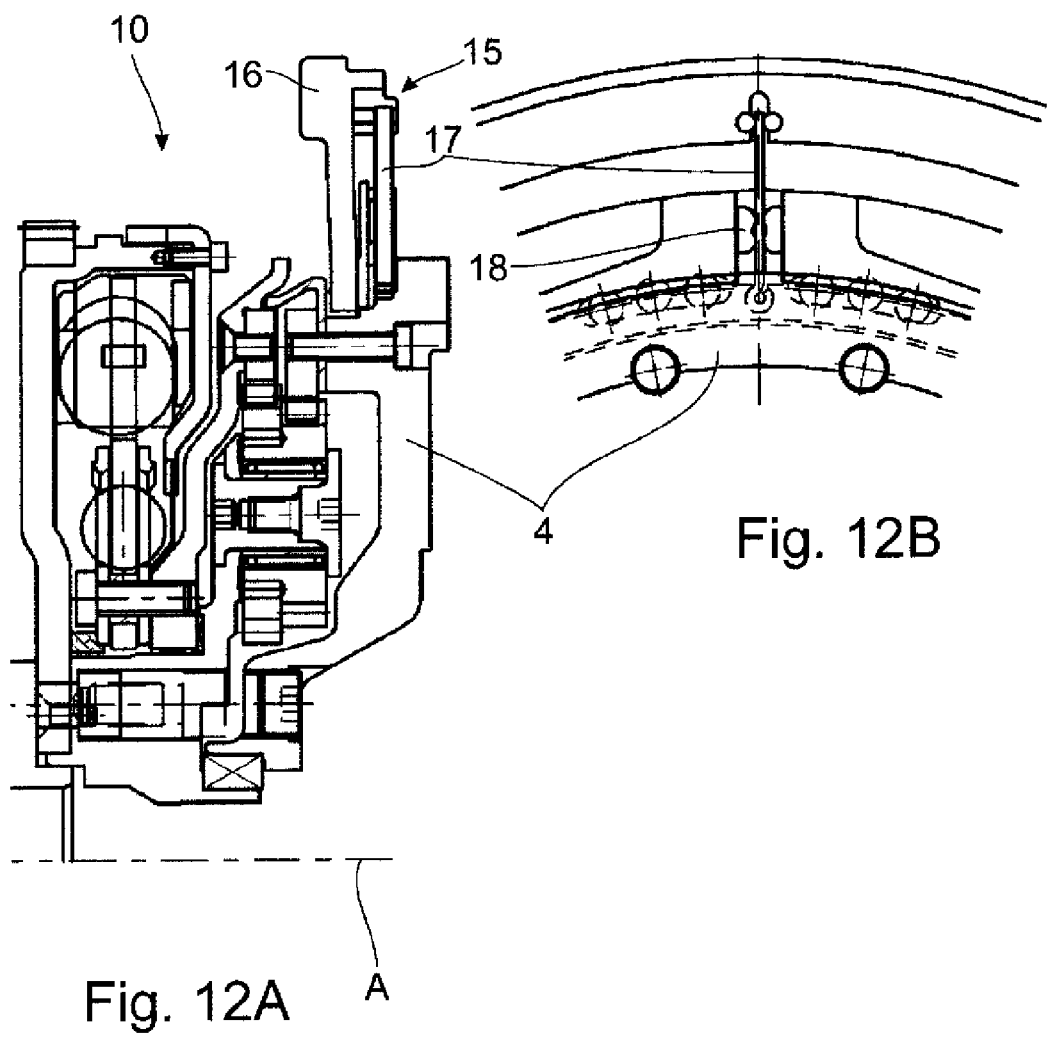
FIG. 12A a torsional vibration damper arrangement with an adjustable fixed-frequency mass damper as pendulum mass radially outward at the output portion.
FIG. 12B a side view of FIG. 12A in the direction of the secondary fly wheel.

FIGS. 12A and B shows a torsional vibration damper arrangement 10 basically like that shown in FIG. 11, but with an adjustable fixed-frequency mass damper 15 as pendulum mass 16. In the case of the fixed-frequency mass damper 15, its mass is connected via a leaf spring 17 to the mass to be damped, in this case the secondary flywheel 4. By means of a sliding block 18 which is spring-loaded and moves radially outward against the spring force as a result of the centrifugal force, the flexible length of the leaf spring 17 can be decreased as the rotational speed increases and the stiffness of the leaf spring 17 can accordingly be increased. By changing the flexible length of the leaf spring 17 in this way, the principal engine order can be damped at different rotational speeds. If the length of the leaf spring 17 were always the same, the pendulum mass 16 would only work on one excitation frequency.

Figure 13:
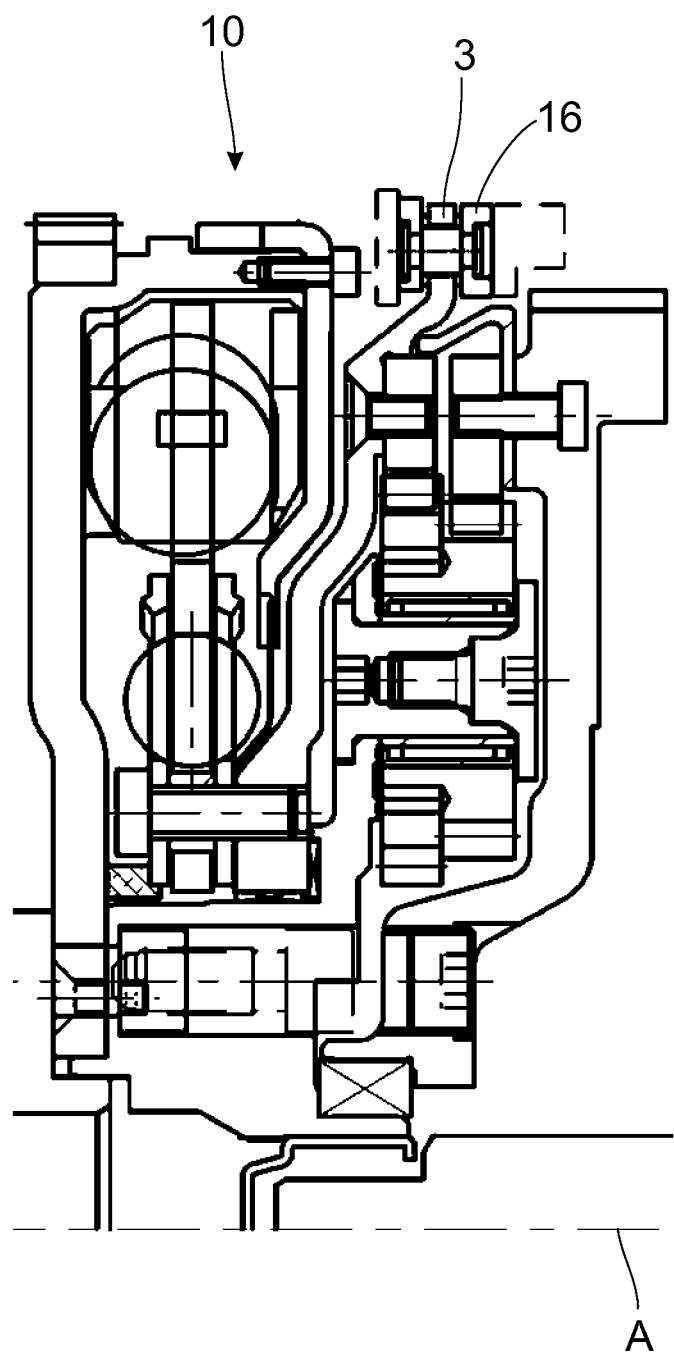
FIG. 13 a torsional vibration damper arrangement with a pendulum mass at an intermediate mass.

FIG. 13 shows a torsional vibration damper arrangement 10 basically like that shown in FIG. 10, but with a pendulum mass 16 which can be positioned radially outward on both sides or also on one side at the intermediate mass 3. The large connection radius is advantageous for the efficiency of the pendulum mass 16. The pendulum mass 16 operates in this case on the Salomon principle.

Figure 14:
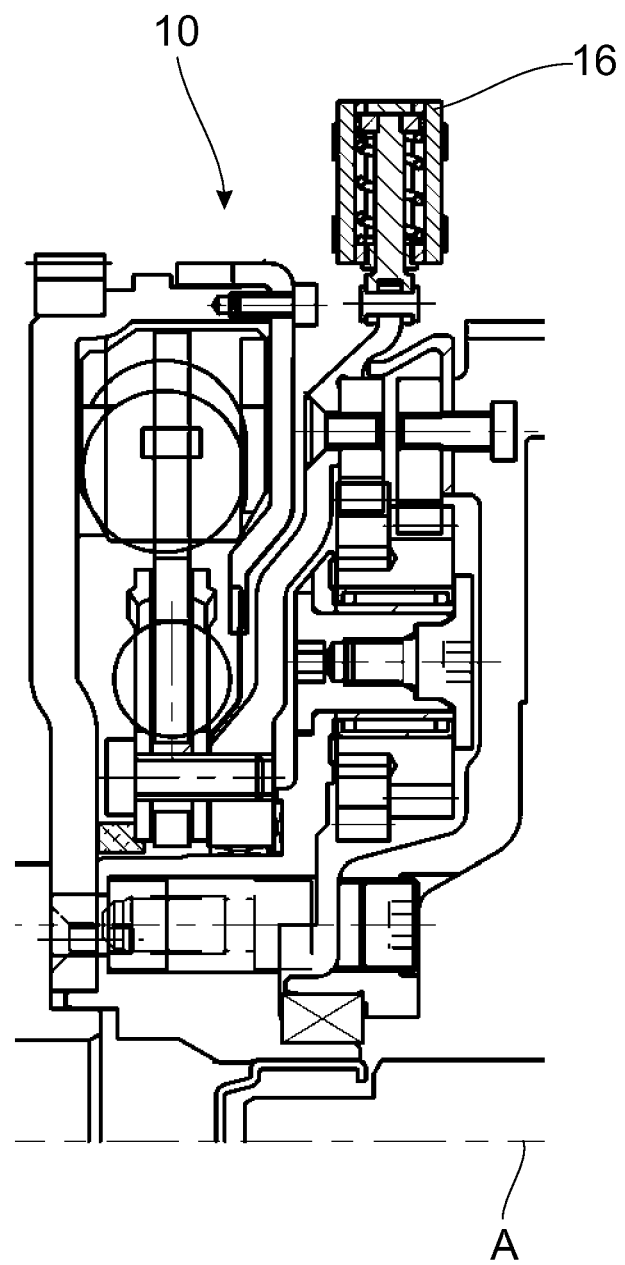
FIG. 14 a torsional vibration damper arrangement with an adjustable pendulum mass radially outward at the intermediate mass operating on the Sarazin principle.

FIG. 14 shows a torsional vibration damper arrangement 10 basically like that shown in FIG. 13, but with a Sarazin-type pendulum mass 16. Here, in contrast to FIG. 13, the connection radius or centroid radius of the pendulum mass 16 is variable over centrifugal force (=rotational speed) and is accordingly frequency-variable. The connection radius of the pendulum mass is transformed via a resilient bearing.

Figure 15:
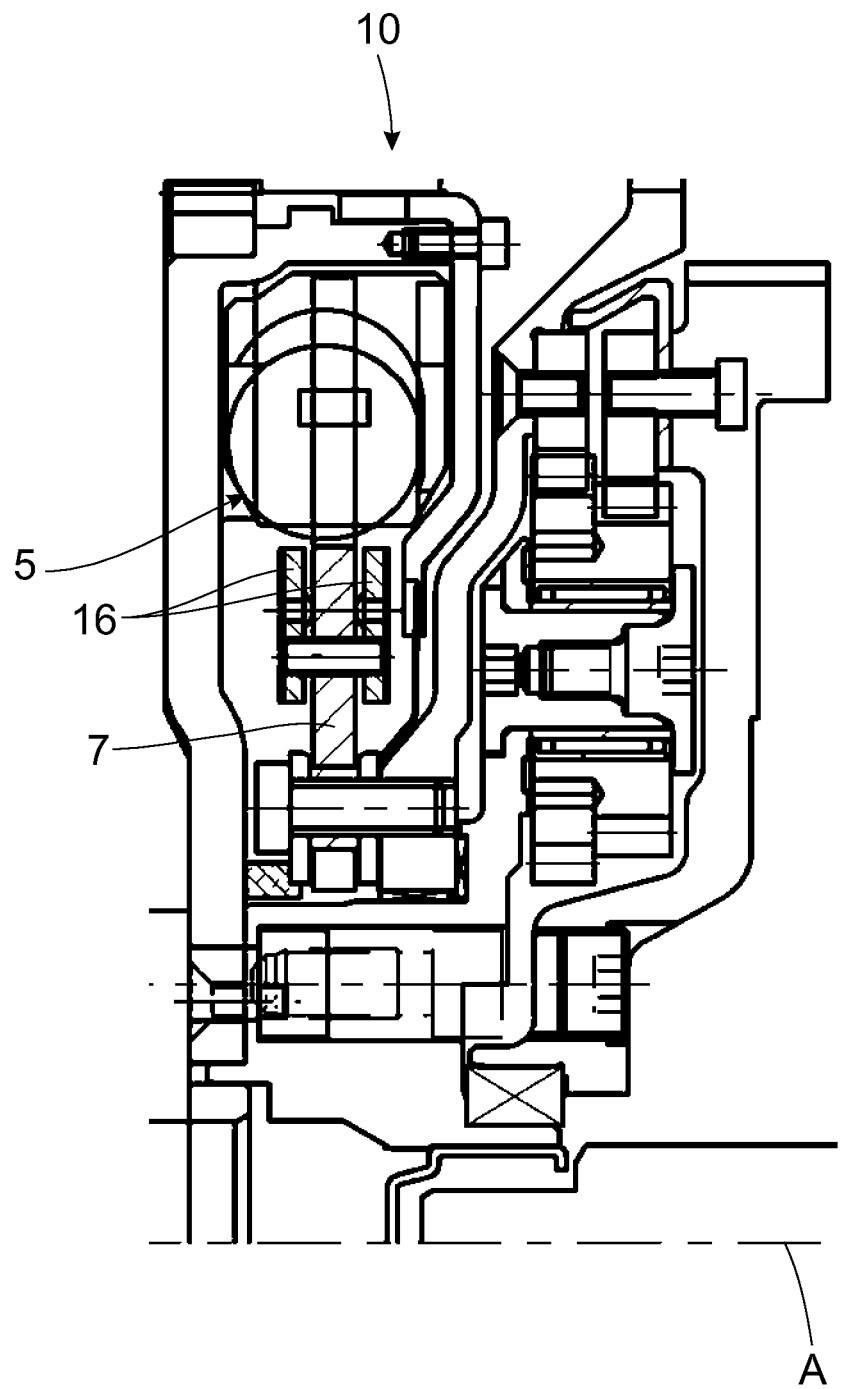
FIG. 15 a torsional vibration damper arrangement with a pendulum mass at a hub disk of the phase shifter arrangement.

FIG. 15 shows a torsional vibration damper arrangement 10 basically like that shown in FIG. 1, but with a pendulum mass 16 which is positioned on both sides at the hub disk 7 radially inward of the outer spring set 5. An inner spring set 6 is not provided in this constructional variant. This embodiment can be seen as particularly advantageous with respect to installation space because it utilizes the installation space radially inward of the outer spring set 5. The pendulum mass 16 shown here is a Salomon-type mass damper.

Figure 16:
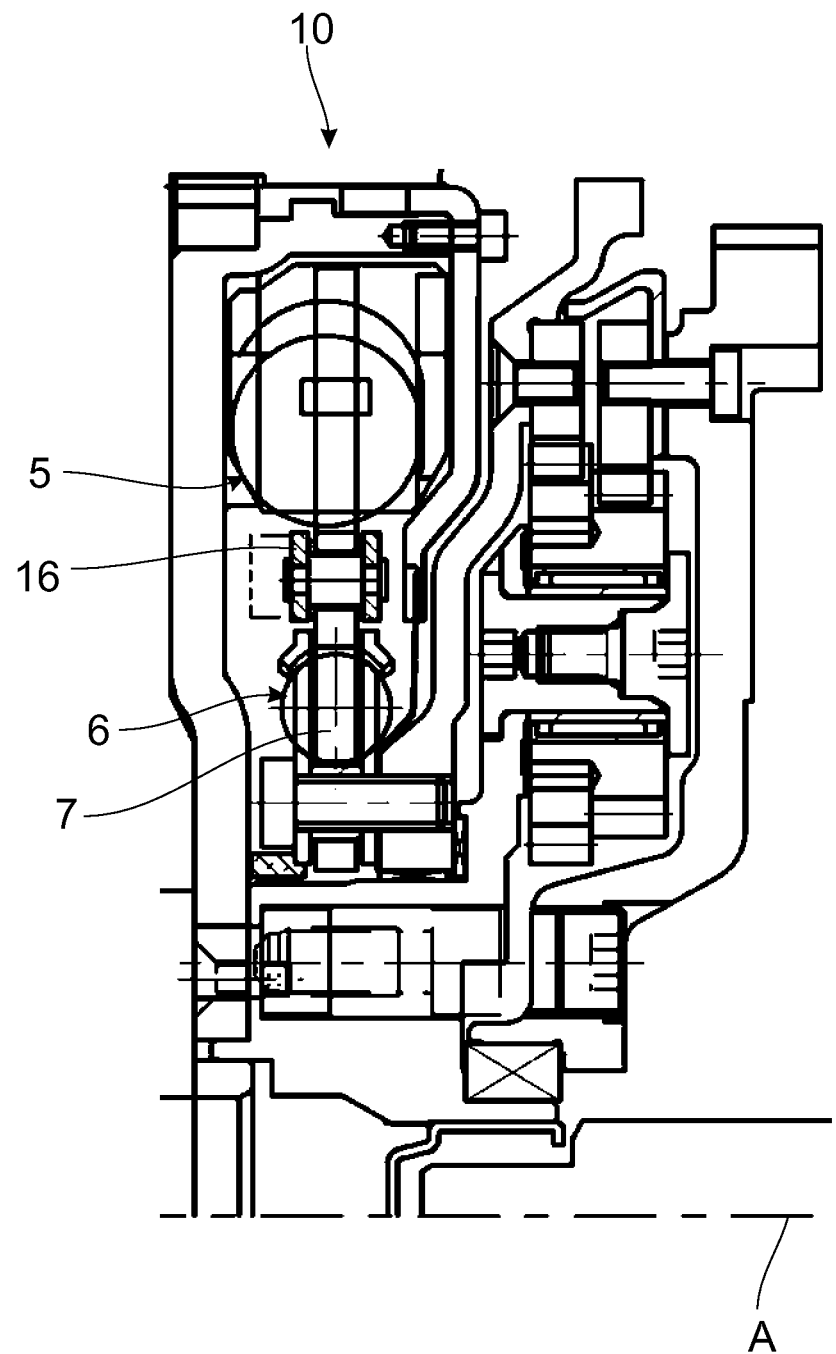
FIG. 16 a torsional vibration damper arrangement with a pendulum mass arranged radially between inner spring set and outer spring set at the hub disk.

FIG. 16 shows a torsional vibration damper arrangement 10 basically like that shown in FIG. 15, but with a pendulum mass 16 which is arranged radially between the outer spring set 5 and the inner spring set 6 at the hub disk 7. As in FIG. 15, the Salomon-type mass damper is shown here.

Finally, FIGS. 17A and B are schematic depictions of a torsional vibration damper arrangement with individual connection options for the pendulum mass.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

REFERENCE NUMERALS 1 primary mass
2 cover plate
3 intermediate mass
4 secondary flywheel
5 outer spring set
6 inner spring set
7 hub disk
8 planet carrier
9 planet wheels
10 torsional vibration damper arrangement
14 shroud
15 fixed-frequency mass damper
16 pendulum mass
17 leaf spring
18 sliding block
22 bearing intermediate mass
23 bearing intermediate mass
24 bearing secondary flywheel
29 crankshaft
30 main branch
31 superposition branch
32 coupling gear unit
36 connection plate
38 stiffness planet carrier
39 clutch disk
40 clutch disk damper
41 adapter piece
42 axial stop
50 input region
51 vibrational system
52 screw bolt
53 spring arrangement
54 installation space
55 first torque transmission path
56 second torque transmission path
57 spring units
58 spring units
60 output region
61 coupling arrangement
65 phase shifter arrangement
67 through-aperture
68 enlarged damper mass
70 first input portion
71 second input portion
75 superposition unit
77 output portion
A axis of rotation A

What is claimed is:

1. A torsional vibration damping arrangement (10), comprising:
an input region (50) to be driven in rotation around an axis of rotation (A);
an output region (60);
a first torque transmission path (55) and parallel thereto a second torque transmission path (56), both the first and second torque transmission paths proceeding from the input region (50);
a coupling arrangement (61) for superposing the torques conducted via the torque transmission paths (55; 56), the coupling arrangement (61) communicating with the output region (60);
a phase shifter arrangement (65) for the first torque transmission path (55) for generating a phase shift of rotational irregularities conducted via the first torque transmission path (55) relative to rotational irregularities conducted via the second torque transmission path (56);
a pendulum mass (16) constructed such that the pendulum mass displaces relative to a carrier element under the influence of a torsional irregularity; and
additionally comprising a primary mass (1) formed by an engine-side housing shell and a cover plate (2) formed by a transmission-side housing shell connected to the primary mass (1) so as to be fixed with respect to rotation relative to the primary mass (1), the primary mass (1) and cover plate (2) fixedly connected radially outwardly relative to the phase shifter arrangement (65) and forming an enclosure for the phase shifter arrangement (65); and wherein the pendulum mass (16) is connected with the primary mass (1) and/or with the cover plate (2).

2. The torsional vibration damping arrangement (10) according to claim 1, wherein the coupling arrangement (61) comprises:

a first input portion (70), a second input portion (71); a superposition unit (75) and an output portion (77), wherein the first input portion (70) is connected to the phase shifter arrangement (65) and superposition unit (75), and the second input portion (71) is connected to the input region (50) and superposition unit (75), and the superposition unit (75) is connected to the first input portion (70), second input portion (71) and output portion (77), and wherein the output portion (77) forms the output region (60).

3. The torsional vibration damping arrangement (10) according to claim 1, wherein the phase shifter arrangement (65) comprises a vibrational system (51) having an intermediate mass (3) which is rotatable with respect to the primary mass (1) around the axis of rotation (A) against the action of a spring arrangement.

4. The torsional vibration damping arrangement (10) according to claim 2, wherein the pendulum mass (16) is coupled in the coupling arrangement (61) with the first input portion (70) or with the second input portion (71) or with the output portion (77).

5. The torsional vibration damping arrangement (10) according to claim 3, wherein the pendulum mass (16) is coupled in the coupling arrangement (61) with the first input portion (70) or with the second input portion (71) or with the output portion (77).

\* \* \* \* \*